(12) United States Patent
Meek et al.

(10) Patent No.: US 6,731,736 B2
(45) Date of Patent: *May 4, 2004

(54) METHOD, SYSTEM, AND DATABASE FOR PROVIDING A TELECOMMUNICATION SERVICE

(75) Inventors: William H. Meek, Chicago, IL (US); Rodney T. Brand, Lisle, IL (US); Conita K. Vandevender, Itasca, IL (US); John D. Curtis, Bolingbrook, IL (US); Marianne J. Stanke, Elmhurst, IL (US); Judy A. Snider, Indianapolis, IN (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/319,428

(22) Filed: Dec. 13, 2002

(65) Prior Publication Data

US 2003/0138091 A1 Jul. 24, 2003

Related U.S. Application Data

(63) Continuation of application No. 09/940,568, filed on Aug. 28, 2001, now Pat. No. 6,516,057, which is a continuation of application No. 09/544,579, filed on Apr. 6, 2000, now Pat. No. 6,327,357, which is a continuation of application No. 08/887,027, filed on Jul. 2, 1997, now Pat. No. 6,148,070.

(51) Int. Cl.[7] .............. H04M 3/42; H04M 7/00
(52) U.S. Cl. .............. 379/211.02; 379/218.01; 379/221.08
(58) Field of Search .............. 379/211.01, 211.02, 379/218.01, 218.02, 220.01, 221.08–221.1

(56) References Cited

U.S. PATENT DOCUMENTS

| | | | |
|---|---|---|---|
| 5,524,142 A | 6/1996 | Lewis et al. | 379/114.25 |
| 5,537,464 A | 7/1996 | Lewis et al. | 379/114.25 |
| 5,768,358 A | 6/1998 | Venier et al. | 379/221.14 |
| 5,818,919 A | 10/1998 | Berberich, Jr. et al. | 379/211.02 |
| 5,903,639 A | 5/1999 | Lipchock et al. | 379/221.08 |
| 6,148,070 A | 11/2000 | Meek et al. | 379/210.02 |
| 6,327,357 B1 | 12/2001 | Meek et al. | 379/218.01 |

*Primary Examiner*—Benny Q. Tieu
(74) *Attorney, Agent, or Firm*—Brinks Hofer Gilson & Lione

(57) ABSTRACT

A database for a telecommunication service includes a first record for a first number having a predetermined NXX, and a second record for a second number having the predetermined NXX. The first record includes an indication that a call having an automatic number identification associated therewith is acceptable for the first number. The second record includes an indication that a call having at least one of an automatic number identification and a calling party identification associated therewith is acceptable for the second number. Associated methods and systems for providing a telecommunication service for the predetermined NXX are disclosed.

13 Claims, 6 Drawing Sheets

| | 555 ACCESS SERVICE NUMBER | NATIONAL/LATA | NETWORK-ROUTABLE TELEPHONE NUMBER | BILLING METHOD | ACCEPTED CALLING PARTY INFORMATION | CIC |
|---|---|---|---|---|---|---|
| 10 | NPA-555-XXXX | INDICATION | NPA-NXX-XXXX OR 555-XXXX | INDICATION | ANI ONLY | XXXX |
| 2 | NPA-555-XXXX | INDICATION | NPA-NXX-XXXX OR 555-XXXX | INDICATION | ANI OR CPID ONLY | XXXX |
| 4 | NPA-555-XXXX | INDICATION | NPA-NXX-XXXX OR 555-XXXX | INDICATION | ALL CALLS | XXXX |
| | | | | | | |

(columns: 20, 22, 26, 30, 32, 34)

| 555 ACCESS SERVICE NUMBER | NATIONAL/LATA | NETWORK-ROUTABLE TELEPHONE NUMBER | BILLING METHOD | ACCEPTED CALLING PARTY INFORMATION | CIC |
|---|---|---|---|---|---|
| NPA-555-XXXX | INDICATION | NPA-NXX-XXXX OR 555-XXXX | INDICATION | ANI ONLY | XXXX |
| NPA-555-XXXX | INDICATION | NPA-NXX-XXXX OR 555-XXXX | INDICATION | ANI OR CPID ONLY | XXXX |
| NPA-555-XXXX | INDICATION | NPA-NXX-XXXX OR 555-XXXX | INDICATION | ALL CALLS | XXXX |
| | | | | | |

Fig. 1

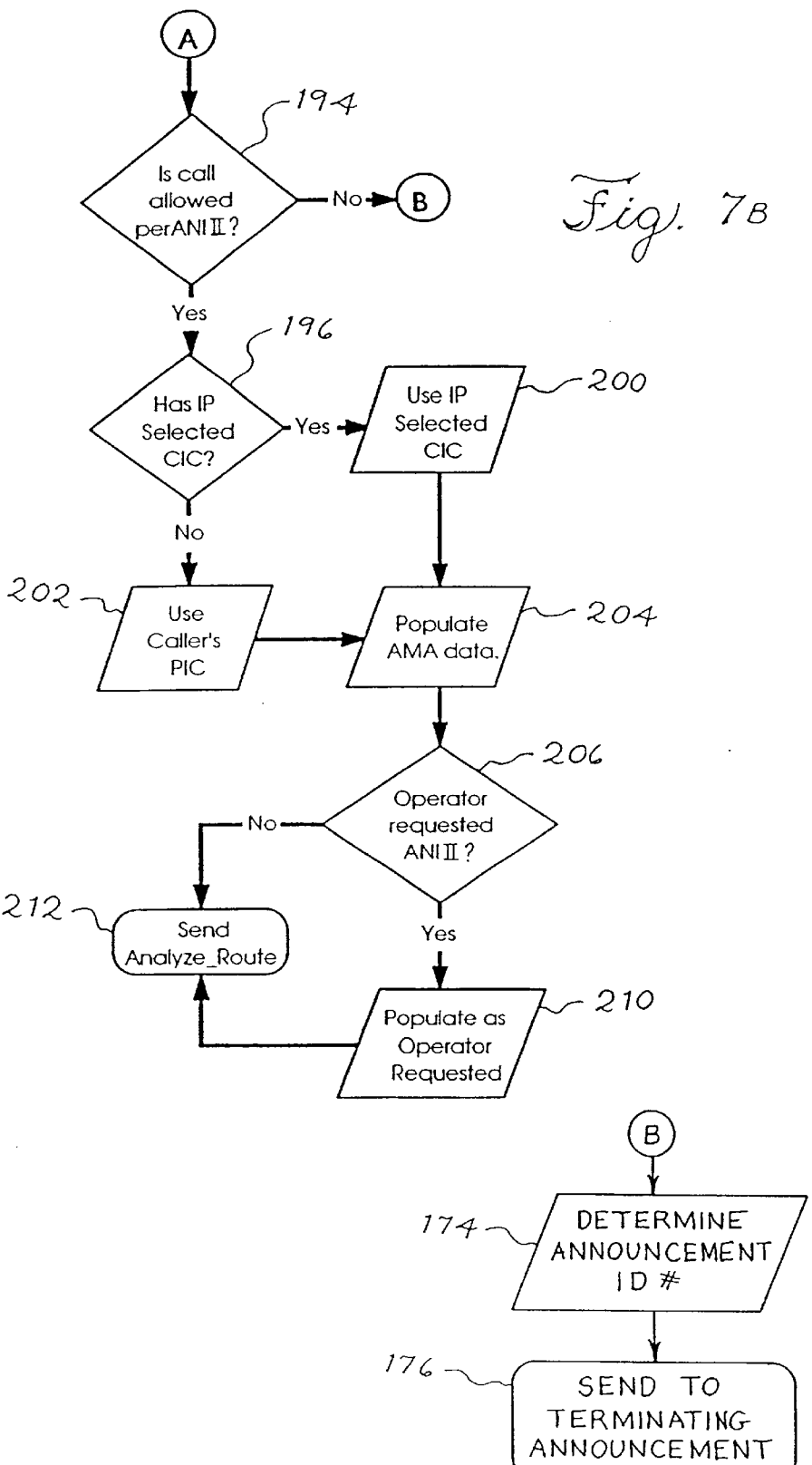

METHOD, SYSTEM, AND DATABASE FOR PROVIDING A TELECOMMUNICATION SERVICE

This application is a continuation of application Ser. No. 09/940,568, filed Aug. 28, 2001, now U.S. Pat. No. 6,516,057 which is a continuation of application Ser. No. 09/544,579, filed Apr. 6, 2000, which issued as U.S. Pat. No. 6,327,357 on Dec. 4, 2001, which is a continuation of application Ser. No. 08/887,027, filed Jul. 2, 1997, which issued as U.S. Pat. No. 6,148,070 on Nov. 14, 2000, which are hereby incorporated by reference herein.

TECHNICAL FIELD

The present invention relates to methods and systems for providing telecommunication services.

BACKGROUND OF THE INVENTION

Previously, "555" NXX calls were dedicated for directory assistance services. For example, a "555-1212" call provides directory assistance within a calling party's area code, and a "NPA-555-1212" call provides directory assistance within another area code depending on a local dialing plan.

The Industry Numbering Committee (INC) approved guidelines to broaden the assignment of 555 NXX line numbers in a document entitled, 555 *NXX Assignment Guidelines,* INC#94-0429-002. These guidelines enable the assignment of 555 numbers on either a national basis or a non-national basis. In accordance with these guidelines, the number 555-1212 is considered unassignable for any purpose other than directory assistance services provided by interexchange and local exchange carriers. In addition, a block of one hundred 555 line numbers from 555-0100 to 555-0199 are reserved as fictitious non-working numbers for use by the entertainment and advertising industries. Other 555 numbers also have been grandfathered.

Using these guidelines, many enhanced service providers, information providers, and businesses have requested and been assigned 555 numbers for their use.
As of June 1996, 2,143 numbers have been assigned of the available 555 numbers. Of these assigned numbers, 1,785 (83%) numbers are national numbers. The industry expectation is a 7 digit dialed 555 number.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a block diagram of example of records in a database for a 555 access service in accordance with the present invention;

FIGS. 7A–7C are flow charts of an embodiment of method of call processing at a service control point to provide the 555 access service.

DETAILED DESCRIPTION OF PREFERRED EMBODIMENTS

Figure 2:
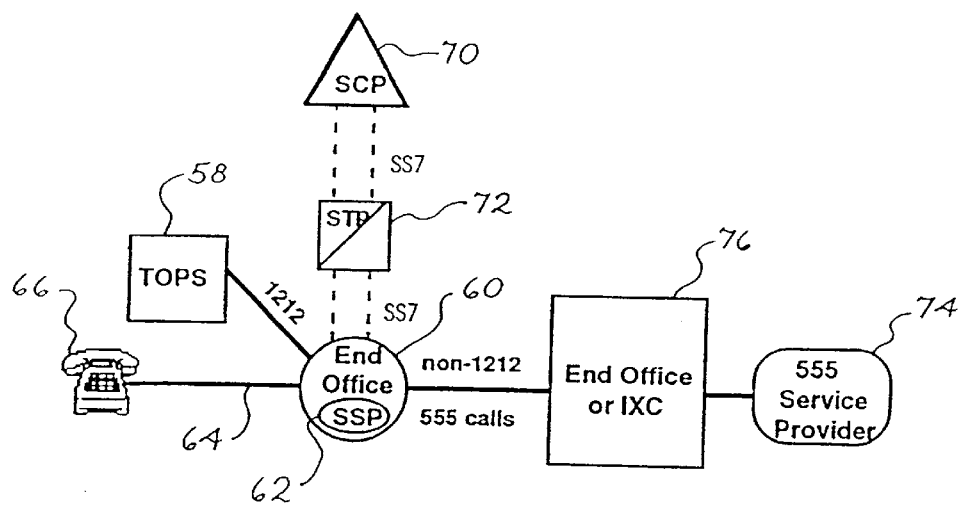
FIG. 2 is a block diagram of a first embodiment of a telecommunication system for providing the 555 access service.

Preferred embodiments of the present invention provide a 555 access service in a public switched telephone network. It is noted, however, that the teachings herein can be extended to other telecommunication services. Further, alternative embodiments of the present invention can utilize NXX prefixes which differ from "555". The herein-described 555 access service can be used for voice calls and/or data calls.

Embodiments of the 555 Access Service give the recipient of the call, which can be an interexchange carrier (IXC) or an information provider (IP), the option to block calls without Automatic Number Identification (ANI). Because of various network configurations, and/or routing circumstances, ANI may not be passed with every 555 call. There may be times when only the Calling Party ID (CPID) is available and times when no information on the call originator is available. For example, the call can carry the ANI if the 555 Access Service trigger is encountered in the originating end office and may not carry ANI if the trigger is encountered in an office other than the originating office.

The 555 Access Service allows 7-digit dialing of a 555 number whether it be a national number or a non-national number. When a calling party dials a 10-digit 555 number using their Home NPA (HNPA), the call is treated in the same manner as a 7-digit dialed number where the local dialing plan permits. This allows the 555 Service to be deployed in areas where 7 or 10 digit dialing is supported.

If a calling party dials a 10-digit 555 number using a foreign NPA (FNPA), the call is routed to a tandem switch and/or a TOPS (Operator Position System) switch serving that NPA via either an interexchange carrier (IXC) identified by the presubscribed carrier identification code (PIC) of the calling party, or a dialed IXC as in 10XXX dialing which is ultimately handled by a terminating network.

The 555 Access Service is provided without interfering with current usage of 555-1212 Directory Assistance services. For this purpose, the service uses SSP (service switching point) switches having the capability to cause 555-1212 calls to be segregated from all other 555 traffic for routing in a separate manner. SSP end offices and SSP tandem switches segregate and route 555-1212 calls to a local TOPS DA switch, while causing all other 555 traffic to encounter a 3/6/10 digit trigger in the office's translations.

In contrast, non-SSP end offices route all 555 traffic, 1212 and non-1212 alike, to the local TOPS DA switch. In this case, the TOPS DA switch segregates 555-1212 calls for normal DA treatment, and forwards all other 555 traffic to the local tandem switch where a 3/6/10 digit trigger is encountered.

Terminating 555 calls can be accommodated as well using embodiments of the present invention. A terminating 555 call is a call that is not converted to a routable number or given final treatment anywhere along the routing of the call. Such a call arrives at the network with the 555 number intact. In this case, an AIN 3/6/10 digit trigger is encountered for the call at the tandem switch receiving the call. The call is subsequently processed upon encountering the trigger.

The Local Exchange Routing Guide (LERG) may reflect the routing of 555 calls to tandem office(s) for a targeted NPA. This allows 555 terminating traffic to have a target office where an AIN trigger may be placed. If the calls route to the TOPS in the targeted NPA, the calling party ID may not be passed to the tandem office from TOPS.

All 555 calls dialed using 10 digits with an inter-LATA NPA are routed according to the LERG. These calls do not encounter an AIN trigger in the originating office. These calls are routed directly from the originating office to the calling party's IXC identified by PIC. The terminating LEC is responsible for converting the 555 number to a routable telephone number or final treatment in any case.

The 555 Access Service logic routes queries for all non-working 555 numbers to an appropriate terminating announcement.

FIG. 1 is a block diagram of example of records in a database for a 555 access service in accordance with the present invention. Preferably, the database is associated with a service control point (SCP) which directs call processing in accordance with service logic described hereinafter. The database includes a computer-readable storage medium which stores each of the records in a computer-readable form.

Each record corresponds to a subscriber of the 555 access service. The subscribers of the 555 access service can be synonymously referred to as 555 Service Providers.

Each record includes a 555 access service number 20, an indication 22 of whether the number is national or non-national, a network-routable telephone number 26 associated with the 555 number, an indication 30 of a billing method for calls to the 555 number, an indication 32 of accepted types of calling party information, and a carrier identification code 34 of an interexchange carrier to carry calls to the 555 number.

The 555 access service number 20 is either national or non-national based upon the indication 22. A national number means that the Information Provider (IP) has the same 7-digit number available in at least 30% of the NPAs in the U.S. and assigned to one IP nationwide. Preferably, the smallest serving area for a 555 number is a LATA.

The indication 30 of the billing method is selected from a first indication that the calling party is to pay for the call, and a second indication that the provider is to pay for the call. The calling party can be billed a flat rate charge and/or a minutes of use (MOU) charge. For example, the calling party can be billed using a 976-like billing method wherein the originator is charged in timed increments similar to 976 pay-per-call services, or using a 900-like billing method wherein the originator is charged a predetermined amount per call similar to 900 pay-per-call services.

The indication 32 of accepted types of calling party information is selected from a first indication that only calls having an associated ANI are to be accepted, a second indication that calls having an associated ANI or a calling party number are to be accepted, and a third indication that all calls (including a call without at least one of an ANI and a calling party identification) are to be accepted. For purposes of illustration and example, the records include a first record 40 for a first subscriber that only accepts 555 calls having an associated ANI, a second record 42 for a second subscriber that only accepts calls having either an associated ANI or a calling party number, and a third record 44 for a third subscriber that accepts all calls.

The carrier identification code 34 may be specified by the subscriber. If an interexchange carrier is not identified, a default carrier carries intra-LATA traffic to the subscriber, and the calling party's presubscribed carrier identification code (PIC) identifies the carrier to carry inter-LATA traffic to the subscriber.

The aforementioned records can be administered by either an interface to an SMS (Service Management System) or directly from an SMS in accordance with an AIN architecture.

FIGS. 2 to 5 illustrate architectures for providing the 555 Access Service in a telecommunication system. Each of the architectures segregate 555-1212 calls from all other 555 traffic. In particular, 555-1212 calls are routed to and treated by a TOPS DA 58. All subsequent references to 555 calls, 555 numbers or 555 traffic with reference to FIGS. 2 to 5 assume non-1212 calls unless otherwise specifically stated.

FIG. 2 is a block diagram of a first embodiment of a telecommunication system for providing the 555 access service. The telecommunication system includes an end office 60 having a service switching point (SSP) 62. The end office 60 serves a plurality of telephone lines including a telephone line 64.

In response to a 7-digit 555 number or a 10-digit HNPA-555 number dialed by a subscriber unit 66 associated with the telephone line 64, a 3/6/10 digit trigger is encountered at the SSP 62. The SSP 62 generates a query message for an SCP 70 in response to the trigger. The query message is communicated to the SCP 70 via a signal transfer point (STP) 72. Preferably, the query message includes an Info__Analyzed message in accordance with AIN 0.1.

The SCP 70 processes the query message in accordance with the 555 access service logic to form a response message. The response message can include a Send__To__Resource message indicating that the call should be routed to an AIN terminating announcement, an Analyze__Route message indicating that the call should be routed to the service provider 74, or a Continue message indicating that the call should be routed to a switch-based announcement. The SCP 70 communicates the response message to the SSP 62 via the STP 72.

If an Analyze__Route message is received, the SSP 62 completes the call to a 555 Service Provider 74 associated with the number dialed by the subscriber unit 66. The call is completed to the 555 Service Provider 74 via a node 76 which can include an end office or an interexchange carrier.

If a Send__To__Resource message is received, the SSP 62 inhibits completion of the call to the 555 Service Provider 74. The call is terminated to an announcement.

If a Continue message is received, the SSP 62 forwards the call to a switch-based announcement (vacant code).

The herein-described Info__Analyzed, Analyze__Route, Send__To__Resource, and Continue messages are preferably formed in accordance with requirements in the Advanced Intelligent Network 0.1 Switching Systems Generic Requirements (TR-NWT-001284) and the Advanced Intelligent Network 0.1 Switch-Service Control Point Application Protocol Interface Generic Requirements (TR-NWT-001285) which are both hereby incorporated by reference into the disclosure of the present application.

Figure 3:
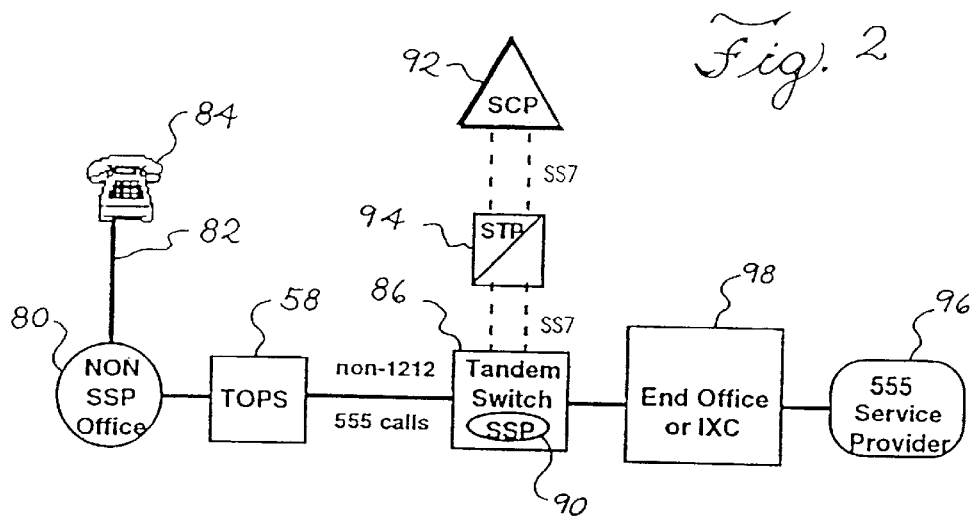
FIG. 3 is a block diagram of a second embodiment of a telecommunication system for providing the 555 access service.

FIG. 3 is a block diagram of a second embodiment of a telecommunication system for providing the 555 Access Service. The telecommunication system includes a non-SSP end office 80 that serves a plurality of telephone lines including a telephone line 82.

The non-SSP end office 80 routes 555 calls, including a 7-digit 555 number or a 10-digit HNPA-555 number dialed by a subscriber unit 84 associated with the telephone line 82, to the TOPS DA switch 58. The TOPS DA switch 58 segregates and services 555-1212 calls from all other 555 traffic. Non-1212 555 calls are routed to a tandem switch 86 having an SSP 90.

A 3/6/10 digit trigger is encountered at the SSP 90 for a 555 call routed thereto. The SSP 90 generates a query message for an SCP 92 in response to the trigger. The query message is communicated to the SCP 92 via a signal transfer point (STP) 94. Preferably, the query message includes an Info_Analyzed message in accordance with AIN 0.1.

The SCP 92 processes the query message in accordance with the 555 service logic to form a response message. The response message can include a Send_To_Resource message indicating that the call should be routed to an AIN terminating announcement, an Analyze_Route message indicating that the call should be routed to a 555 service provider 96, or a Continue message indicating that the call should be routed to a switch-based announcement. The SCP 92 communicates the response message to the SSP 90 via the STP 94.

If an Analyze_Route message is received, the SSP 90 completes the call to the 555 Service Provider 96 associated with the number dialed by the subscriber unit 84. The call is completed to the 555 Service Provider 96 via a node 98 which can include an end office or an interexchange carrier. If a Send_To_Resource message is received, the SSP 90 inhibits completion of the call to the 555 Service Provider 96, and terminates the call to an announcement. Thereafter, the SSP 90 sends a Resource_Clear message to the SCP 92. If a Continue message is received, the SSP 90 forwards the call to a switch-based announcement.

Figure 4:
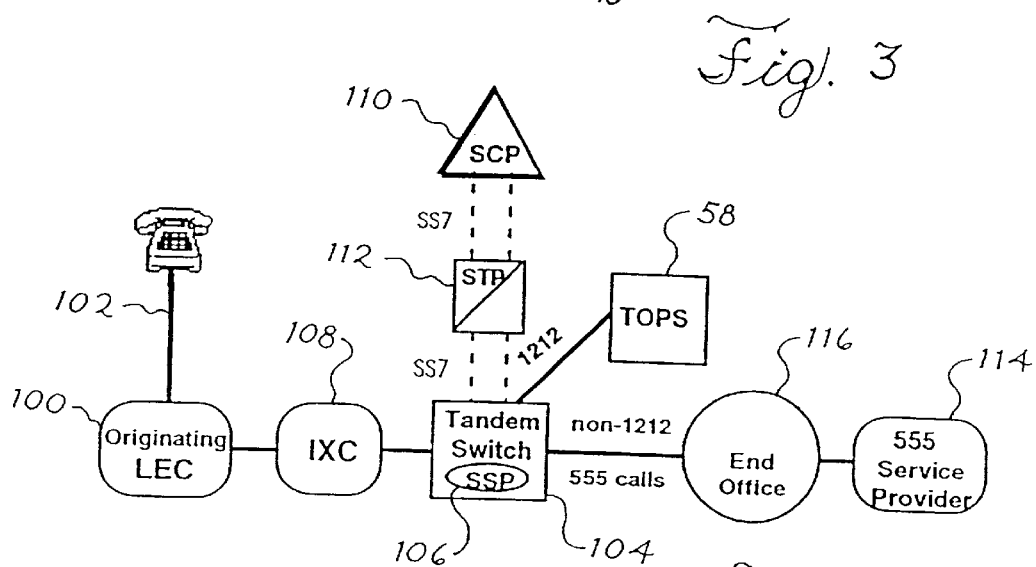
FIG. 4 is a block diagram of a third embodiment of a telecommunication system for providing the 555 access service.

FIG. 4 is a block diagram of a third embodiment of a telecommunication system for providing the 555 Access Service. The telecommunication system includes an originating local exchange carrier (LEC) 100 that serves a plurality of telephone lines including a telephone line 102. The LEC 100 communicates with a tandem switch 104 having an SSP 106 via an interexchange carrier (IXC) 108.

A 555 call that does not encounter a 555 Access Service AIN trigger in the LEC 100 traverses the IXC 108 to the tandem switch 104 with the 555 number intact. In response to the 555 call, a 3/6/10 digit trigger is encountered at the SSP 106. The SSP 106 generates a query message for an SCP 110 in response to the trigger. The query message is communicated to the SCP 110 via a signal transfer point (STP) 112. Preferably, the query message includes an Info_Analyzed message in accordance with AIN 0.1.

The SCP 110 processes the query message in accordance with the 555 service logic to form a response message. The response message can include a Send_To_Resource message indicating that the call should be routed to an AIN terminating announcement, or an Analyze_Route message indicating that the call should be routed to a 555 Service Provider 114. The SCP 110 communicates the response message to the SSP 106 via the STP 112.

If an Analyze_Route message is received, the SSP 106 completes the call to the 555 Service Provider 114 associated with the dialed 555 number. The call is completed to the 555 Service Provider 114 via a node 116 which can include an end office. If a Send_To_Resource message is received, the SSP 106 inhibits completion of the call to the 555 Service Provider 114. The call is terminated to an AIN announcement.

Figure 5:
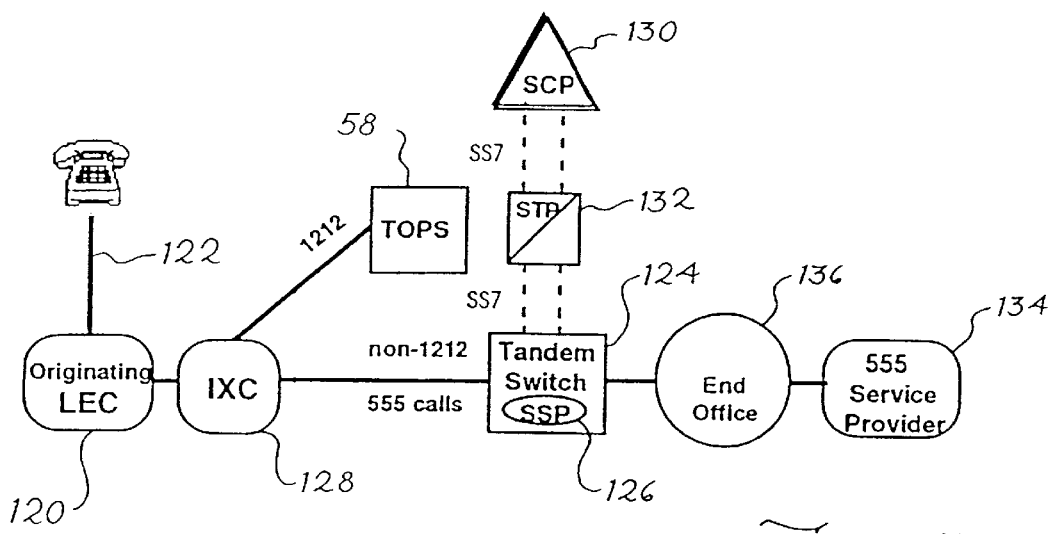
FIG. 5 is a block diagram of a fourth embodiment of a telecommunication system for providing the 555 access service.

FIG. 5 is a block diagram of a fourth embodiment of a telecommunication system for providing the 555 Access Service. The telecommunication system includes an originating local exchange carrier (LEC) 120 that serves a plurality of telephone lines including a telephone line 122. The LEC 120 communicates with a tandem switch 124 having an SSP 126 via an interexchange carrier (IXC) 128.

The IXC 128 has direct trunking to the TOPS DA switch 58. The IXC 128 segregates 555-1212 calls from non-1212 calls. The 555-1212 calls are routed to the TOPS DA switch. All other 555 traffic is routed to the tandem switch 124.

A 3/6/10 digit trigger is encountered at the SSP 126 in response to receiving a 555 call. The SSP 126 generates a query message for an SCP 130 in response to the trigger. The query message is communicated to the SCP 130 via a signal transfer point (STP) 132. Preferably, the query message includes an Info_Analyzed message in accordance with AIN 0.1.

The SCP 130 processes the query message in accordance with the 555 service logic to form a response message. The response message can include a Send_To_Resource message indicating that the call should be routed to a terminating announcement, or an Analyze_Route message indicating that the call should be routed to a 555 Service Provider 134. The SCP 130 communicates the response message to the SSP 126 via the STP 132.

If an Analyze_Route message is received, the SSP 126 completes the call to the 555 Service Provider 134 associated with the dialed 555 number. The call is completed to the 555 Service Provider 134 via a node 136 which can include an end office. If a Send_To_Resource message is received, the SSP 126 inhibits completion of the call to the 555 Service Provider 134, and terminates the call to an AIN announcement.

For the aforementioned embodiments described with reference to FIGS. 2 to 5, the 3/6/10 trigger is put in the translations at each SSP. Since the 3/6/10 trigger does not allow triggering on a single NXX regardless of NPA, a 3/6/10 office trigger is set for each HNPA-555 on which the 555 Access Service is required to trigger. In the case of end offices with multiple HNPAs, a 3/6/10 trigger is set for each NPA in the office.

The segregation of 555-1212 traffic from non-1212 traffic can be performed in variety of ways. To segregate 1212 traffic using a 5ESS switch, a trigger is planted at the NPA-NXX and an RDIT entry for HNPA-555-1212 is added to prevent HNPA-555-1212 from triggering. Using a DMS100, 36 triggers are planted in TRIGDIG to trigger on all 555 calls but 1212, and conventional routing of HNPA-555-1212 is performed. For an EWSD, HNPA-555-1212 is conventionally routed; IN Triggers at the code point are disabled to isolate HNPA-555-1212; and 36 6-digit triggers are planted to trigger on all 555 calls but 1212. For an STP, GTTs are added for NPA-555-0000 thru NPA-555-9999 with translation type 248.

By segregating 555-1212 traffic from non-1212 traffic, the 555 Access Service does hot interfere with directory assistance traffic. Additionally, the SCP is not burdened with handling directory assistance traffic.

In summary, the telecommunication systems of FIGS. 2 and 4 provide means for receiving a 555 NXX call other than 555-1212 and a 555-1212 call at a switching node, means for sending a query associated with the 555 NXX call to a service control point, and means for directing the 555-1212 call to a directory assistance node without sending a query associated therewith to the service control point. The telecommunication system of FIG. 3 provides means for receiving at a directory assistance node a 555-1212 call and a 555 NXX call other than 555-1212, means for routing the 555 NXX call from the directory assistance node to another switch, and means for servicing the 555-1212 call at the directory assistance node.

Figure 6:
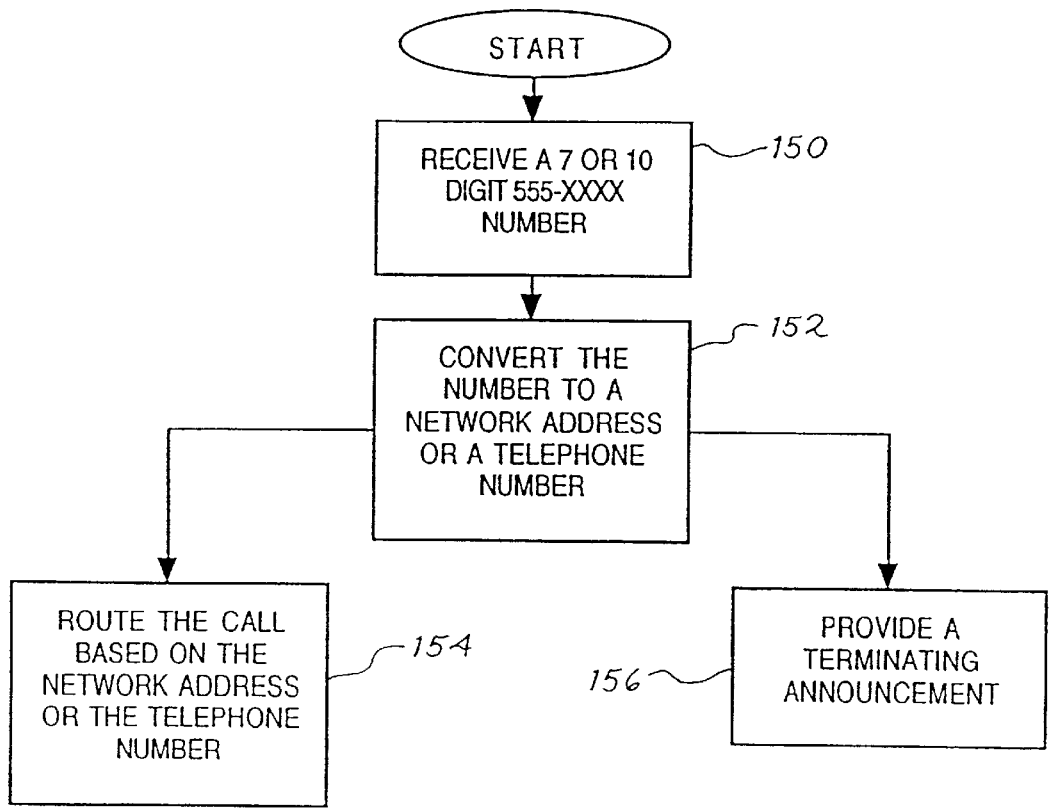
FIG. 6 is a flow chart of a method of providing the 555 access service.

FIG. 6 is a flow chart of a method of providing the 555 access service. The method is performed by an AIN-capable switching office such as an end office or a tandem office of the public switched telephone network.

As indicated by block 150, the method includes a step of receiving a 7 or 10 digit 555-XXXX number dialed by a calling party.

Thereafter, a step of converting the 555-XXXX number is performed as indicated by block 152. The 555-XXXX number can be converted to either a 7 or 10 digit network address. The number can be converted using a translation table lookup or a query of an external database. It is noted that "555" calls can be converted to routable telephone numbers by a telecommunication carrier (TC) such as an originating LEC, an intermediate IXC carrier, or a terminating LEC.

As indicated by block 154, the method includes a step of routing a call to the location of the subscriber based on the number or address returned from the lookup or query. If the 555 number is unassigned, or the lookup or query returns a "vacant" code, a step of providing an announcement to the calling party is performed as indicated by block 156. The announcement indicates to the calling party that the call cannot be completed.

Figure 7A:
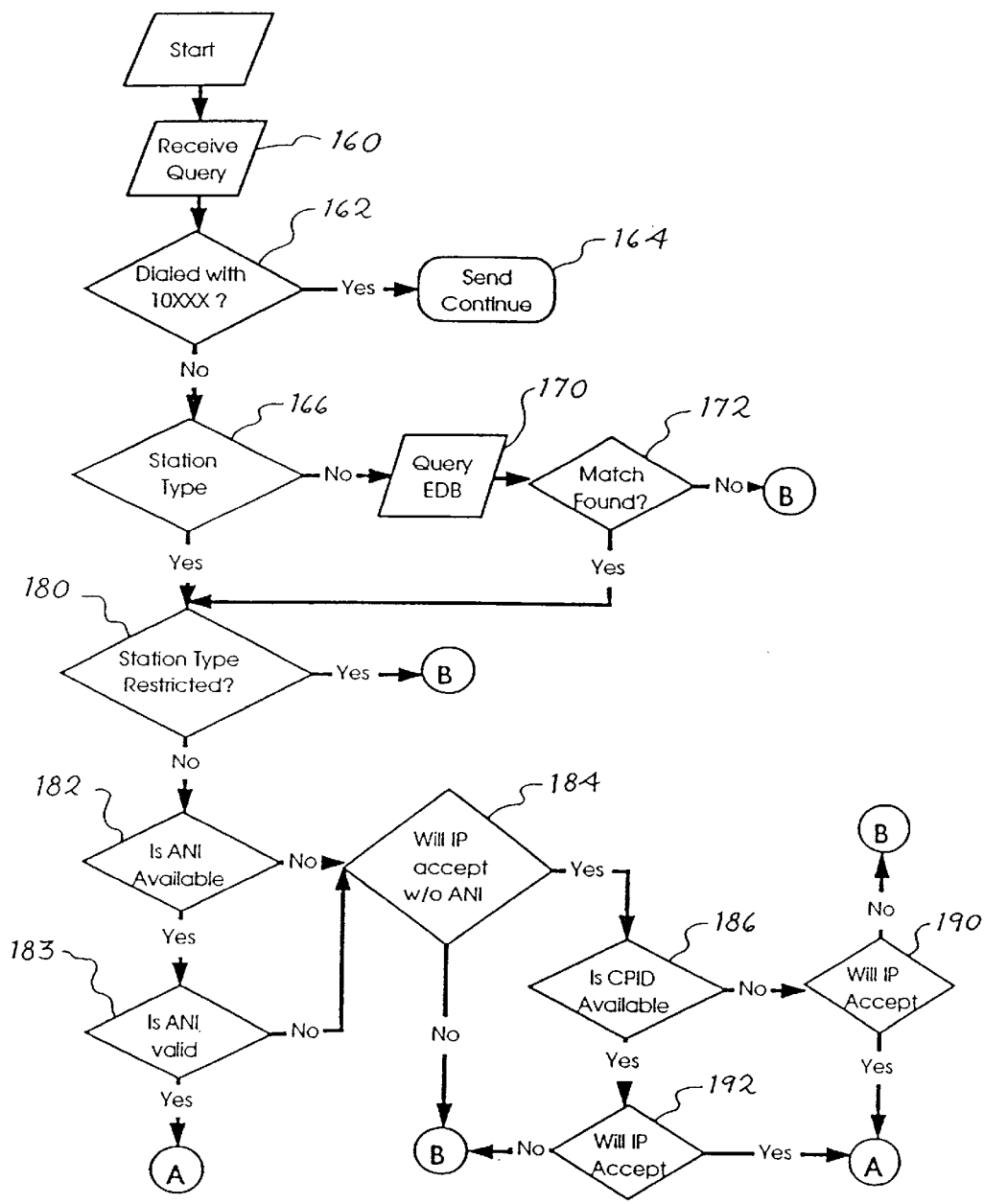

FIGS. 7A–7C are flow charts of an embodiment of method of call processing at a service control point to provide the 555 access service.

As indicated by block 160, the method includes a step of receiving a query message generated by an SSP. The query message is associated with a 555 call. SSP can be associated with a tandem switch or an end office as described earlier. Preferably, the query message includes an Info_Analyzed component having parameters which include CalledPartyID, LATA, TriggerCriteriaType, CallingPartyID, ChargePartyStationType, PrimaryCarrier, and ChargeNumber.

The CalledPartyID parameter includes an odd/even indicator, nature of number data, a numbering plan indicator, and a directory number associated with the called party. The LATA parameter includes an odd/even indicator and three digits which identify the LATA associated with the originating facility. The TriggerCriteriaType parameter indicates the type of event that caused a trigger to occur, e.g. NPANXXXXXX. The CallingPartyID parameter includes an odd/even indicator, nature of number data, a screening indicator, a restriction indicator, and a directory number of the calling party.

The ChargePartyStationType parameter indicates a calling station type. Examples of ChargePartyStationType parameter values include: 0 for an identified line; 1 for an ONI (multiparty); 2 for ANI failure; 6 for a hotel without room identification; 7 for a coinless, hospital, or inmate station; 8 for an interLATA restricted station; 20 for AIOD listed directory number sent; 23 for an identified coin/noncoin line; 24 for an 800 line; 27 for a coin call; 61, 62, 63 for cellular; 64 for AIN 0.1; 66, 67 for TRS; 68 for an interLATA restricted hotel station; 78 for an interLATA restricted station; 95 for a test call; and 99 for an IN (Intelligent Network) Release 0.

The PrimaryCarrier parameter includes a carrier selection parameter and four digits to identify a carrier. The carrier selection parameter can assume values of: 0 associated with no indication; 1 for a presubscribed/not dialed carrier; 2 for a presubscribed/dialed carrier; 3 for a presubscribed/unknown carrier; and 4 for a not presubscribed/dialed carrier.

The ChargeNumber parameter indicates the ANI of the calling party. The ChargeNumber parameter can include an odd/even indicator, nature of number data, a numbering plan indicator, and digits identifying the ANI of the calling party.

As indicated by block 162, the method includes a step of determining if the 555 number is dialed with 10XXX. If so, a step of sending a Continue response message to the SSP is performed as indicated by block 164. The Continue response need not have any parameters populated by the 555 Access Service. If the 555 number is not dialed with 10XXX, a step of determining whether the station type of the calling party is known as indicated by block 166.

If the station type is unknown, a step of querying an external database (EDB) is performed as indicated by block 170. If no match is produced by the query (as determined in block 172), steps of determining an announcement identification number (block 174) and sending the call to a terminating announcement identified thereby (block 176) are performed.

The query to the external database can use the CallingPartyID as a key to make an association with a record therefor. Upon matching either the CallingPartyID with the record for the number, the external database returns Calling Name Delivery information including at least one of: a calling party name, a privacy indicator, a Zip+4 code, and ANI II indicating the station type.

If the station type is known or if a match is found by the query, a step of determining if the station type is restricted is performed (block 180). If the station type is restricted, steps of determining an announcement identification number (block 174) and sending the call to a terminating announcement identified thereby (block 176) are performed.

If the station type is unrestricted, a step of determining if ANI is available for the call is performed as indicated by block 182. If the ANI is unavailable or if the ANI is invalid (as determined in block 183), a step of determining if the subscriber accepts calls without ANI is performed as indicated by block 184. This step is performed by accessing the subscriber record described with reference to FIG. 1. If the subscriber does not accept calls without ANI, steps of determining an announcement identification number (block 174) and sending the call to a terminating announcement identified thereby (block 176) are performed.

In one embodiment of the present invention, the way of determining the validity of the ANI in block 183 is performed by comparing the received ANI to a database which confirms only valid ANI combinations. If the ANI does not appear, it is invalid.

In an alternative embodiment of the present invention, other methods for validating the ANI could be implemented. At a minimum, the system would determine if the ANI is ten digits in length, the NPA and NXX of the charge number are greater than a predetermined constant such as 199.

If the subscriber accepts calls without ANI, a step of determining the availability of calling party identification (CPID) for the call is performed as indicated by block 186. If the CPID is unavailable, a step of determining if the subscriber accepts all calls is performed as indicated by block 190. If the subscriber does not accept all calls, steps of determining an announcement identification number (block 174) and sending the call to a terminating announcement identified thereby (block 176) are performed.

Referring back to block 186, if the CPID is available, a step of determining if the subscriber accepts calls with CPID is performed as indicated by block 192. If the subscriber does not accept CPID calls, steps of determining an announcement identification number (block 174) and sending the call to a terminating announcement identified thereby (block 176) are performed.

If ANI is available and valid (with reference to block 183), or if the CPID is available and the subscriber accepts calls with CPID (with reference to block 192), or if the subscriber accepts all calls (with reference to block 190), a step of determining if the call is allowed per ANI II is performed (block 194). Here, the call is allowed (i.e. completed) or disallowed (i.e. blocked) based upon the ChargePartyStationType parameter and the type of billing method used for the subscriber. Examples of scenarios for allowing and disallowing calls are subsequently described with reference to TABLE I.

If the call is not allowed per ANI II, steps of determining an announcement identification number (block 174) and sending the call to a terminating announcement identified thereby (block 176) are performed.

If the call is allowed per ANI II, a step of determining if the subscriber has selected a CIC is performed as indicated by block 196. If the subscriber has selected a CIC, the subscriber's CIC is used to route the call as indicated by block 200. If the subscriber has not selected a CIC, the caller's PIC is used to route the call as indicated by block 202.

After determining the carrier to route the call, a step of populating AMA data is performed as indicated by block 204. Thereafter, a step of determining if the ANI II indicates that operator assistance be requested is performed as indicated by block 206. Preferably, whenever ANI II digits of 06, 07, 27, 29, or 70 are encountered in the originating station type, the call is considered as requiring operator assistance and, when routing to an IXC CIC code, is flagged for operator requested treatment.

If operator assistance is indicated by the ANI II, a step of populating the response message to request operator assistance is performed as indicated by block 210. Thereafter, or if operator assistance is not required per ANI II, a step of sending the response message is performed (block 212). Preferably, the response message includes an Analyze_Route message. The Analyze_Route response includes the following parameters: ChargeNumber, CallingPartyID, CalledPartyID, PrimaryCarrier, AMAslpID, AMALineNumber, and LineNumberType.

The CalledPartyID contains the directory number associated with the called party (e.g. a "route to" number).

Although not used by the 555 Access Service, the following Info_Analyzed parameters may be passed on to the Analyze_Route response message: OriginalCalledPartyID including the directory number of the first redirecting party; RedirectingPartyID including the directory number of the last redirecting party; and Redirection Information including a reason and a number of forwards.

555 Access Service calls that are routed by the 555 service logic may be routed to 7 or 10 digit telephone numbers via a telecommunication carrier's CIC code with or without operator assistance requested. In order to route accordingly the following Nature of Number Called Parameters are used: (i) Subscriber Number is used when routing to a 7 digit number whether an IXC CIC code is used or not; (ii) National Number is used when routing to a 10 digit number whether an IXC CIC code is used or not; (iii) Subscriber Number, Operator Requested is used when routing a 7 digit number to a LEC's and/or a TC's CIC code and the originating station type requires operator assistance; and (iv) National Number, Operator Requested is used when routing a 10 digit number to an IXCs CIC code and the originating station type requires operator assistance.

It is noted that the step of sending to a terminating announcement in block 176 includes a step of sending a Send_To_Resource message to the SSP. Parameters of the Send_To_Resource message are populated as follows: a ResourceType parameter is populated to indicate a type of resource to which a user is to be connected (e.g. an uninterruptible announcement); and a StrParameterBlock parameter is populated to include information that allows the SCP to request the SSP to play an announcement to a user and/or to collect digits (e.g. an announcement identification number).

Preferably, the 555 Access Service interacts with an AIN PrimeNumber service such as the Ameritech PrimeNumber Service. It is assumed that a 555 number will be chosen by numerous businesses as a single number for their customers to dial in order to reach the nearest outlet of that business. If the access logic passes the initial query directly to the PrimeNumber service, then the PrimeNumber service logic returns the appropriate response routing the call to the nearest outlet for that PrimeNumber subscriber. This saves call setup and processing time, and reduces the number of SS7 queries on the network. Otherwise, another query can be made to the PrimeNumber service during the same call.

If the 555 Service Provider has purchased Caller ID, then Calling Party Number will be passed to the Service Provider when available. If end users block with *67, the Calling Party Number if available is passed along with the associated Privacy Indicator set to private.

Custom intercept announcements are provided for 555 Access Service subscribers. For example, a subscriber who has a 555 number assigned within an NPA but chooses to not offer service in that NPA, can have a custom announcement that directs callers to another number to receive the service.

Optionally, subscriber-specified custom routing of 555 calls based on time of day, day of week, day of year, alternate routing on busy condition, special routing based on calling party number, and/or ANI can be performed.

The 555 Access Service directs the network to form an AMA record to bill the originator of the call or the IP on a per call basis. This is accomplished primarily through the use of AMAslpID passed from the SCP to the SSP for CAMPS. The SCP is the final arbiter of determining when calls can be billed, supplying the appropriate information to the switch, and denying calls when there is insufficient information to correctly bill the call. This is accomplished through analyzing the query data and optionally utilizing additional tables (LATA Lookup) or external databases (EDB). "555" calls are completed only when the SCP receives enough information to ensure that proper billing will take place. In the case where insufficient information is received, the SCP directs the call to a terminating announcement.

When the SCP directs that a call be completed, the returning Analyze_Route response contains the AMAslpID 005550000 and the OverflowBillingIndicator (mod 30) and, only if ANI is present, the AMALineNumber (mod 307) containing 005+the ChargeNumber. When the SCP directs a call to an announcement, no billing indicators are sent.

The billing logic performed by the SCP is as follows. If the service is free to the end user, then end users who dial the 555 numbers should not be billed any charges to access the 555 Access Service. This service flavor is LATA-wide toll/usage free originating for the end user.

The 555 Access Service Provider is billed usage and monthly charges. For usage sensitive elements, billing starts when the call is delivered to the 555 Service Provider.

Calls sent to a 555 Service Provider for handling are charged a data base look up/query charge. Query charges are charged to the Service Provider if review of the call indicates the call is not terminated to the Service Provider but terminated within a predetermined portion of the telecommunication network. In this case, the Service Provider is charged query counts if the call is routed to their network or POTS route to number.

For those Service Providers who choose to have calls terminated into their network via FGD trunks, billing strategy includes the Service Provider being charged existing FGD rates and an additional 555 Access Service surcharge.

AMA is desired in those situations where the originating caller is blocked and/or terminated to an announcement. AMA records are desired for the A-leg of the call.

Billing is provided on a 555 number basis and is billed per 555 number. Billing flexibility can include a separate 555 Access Service bill or the inclusion of 555 Access Service charges on an existing bill format.

TABLE I

| 800-like | DA-like | PPC-like | Station Type |
|---|---|---|---|
| Complete | Block | Block | Hotel/motel |
| Complete | Complete | Block | Coin phone |
| Complete | Complete | Block | Customer owned coin phone |
| Block | Block | Block | 0+ dialed calls |
| Complete | Complete | Block | Independent Pay Phone Provider services |
| Complete | Block | Block | Calls originating from WATS |
| Complete | Block | Block | Two-Party stations |
| Complete | Complete | Block | Inmate services |
| Complete | Complete | Complete | 10XXX or calls dialed using a carrier access code or equivalent |
| Complete | Complete | Complete | Toll calls originating from lines equipped with a toll restriction |
| Complete | Complete | Complete | Cellular calls |

As a result of the various types of 555 service, there are different requirements by the 555 Service Providers with regard to call terminations and billing. The matrix in TABLE I indicates examples of scenarios in which calls are completed or blocked based upon the subscriber-selected billing method and the originating station type Based upon the subscriber-selected billing method, a subscriber record includes data indicative of a column similar to a column of information in TABLE I.

Additionally, the 555 Access Service can provide management reports which include: number of calls by time of day (peg count), number of calls by day, week, month, or other time duration (peg count), number of calls by geographic area (e.g. by exchange), a list of callers by telephone number, a number of calls by each caller (per telephone number), an average call duration, and calls by Zip Code, matching industry demographic reports.

In summary, the service control point determines where the call is to be routed, converts the dialed 555 number to a routable telephone number (TN), or passes the 555 dialed number directly to an Interexchange Carrier (IXC) without conversion. Additionally, the service determines: (i) whether the calling or called party is billed for the call; (ii) whether the calling party's PIC or the IP's CIC is used for the call; (iii) whether the call has sufficient calling party information to be completed or is to be sent to a terminating announcement; (iv) whenever possible, the originating station type (coin, hotel/motel, etc.) for call completion or terminating announcement treatment; and (v) in the case of NPA-wide 555 numbers, the call originating NPA in order to determine appropriate handling of the call.

For those 555 Service Providers who subscribe to the 555 Access Service with a non-national 555 number, the expectation is that the non-national 555 number will be provisioned on a per-NPA basis. Where dialing plans permit 7-digit dialed calls, end users are able to reach the 555 Service Provider by dialing the national 7-digit 555 number. Where dialing plans require 10-digit dialed calls, end users are able to reach the 555 Service Provider by dialing 10 digits.

Figure 8:
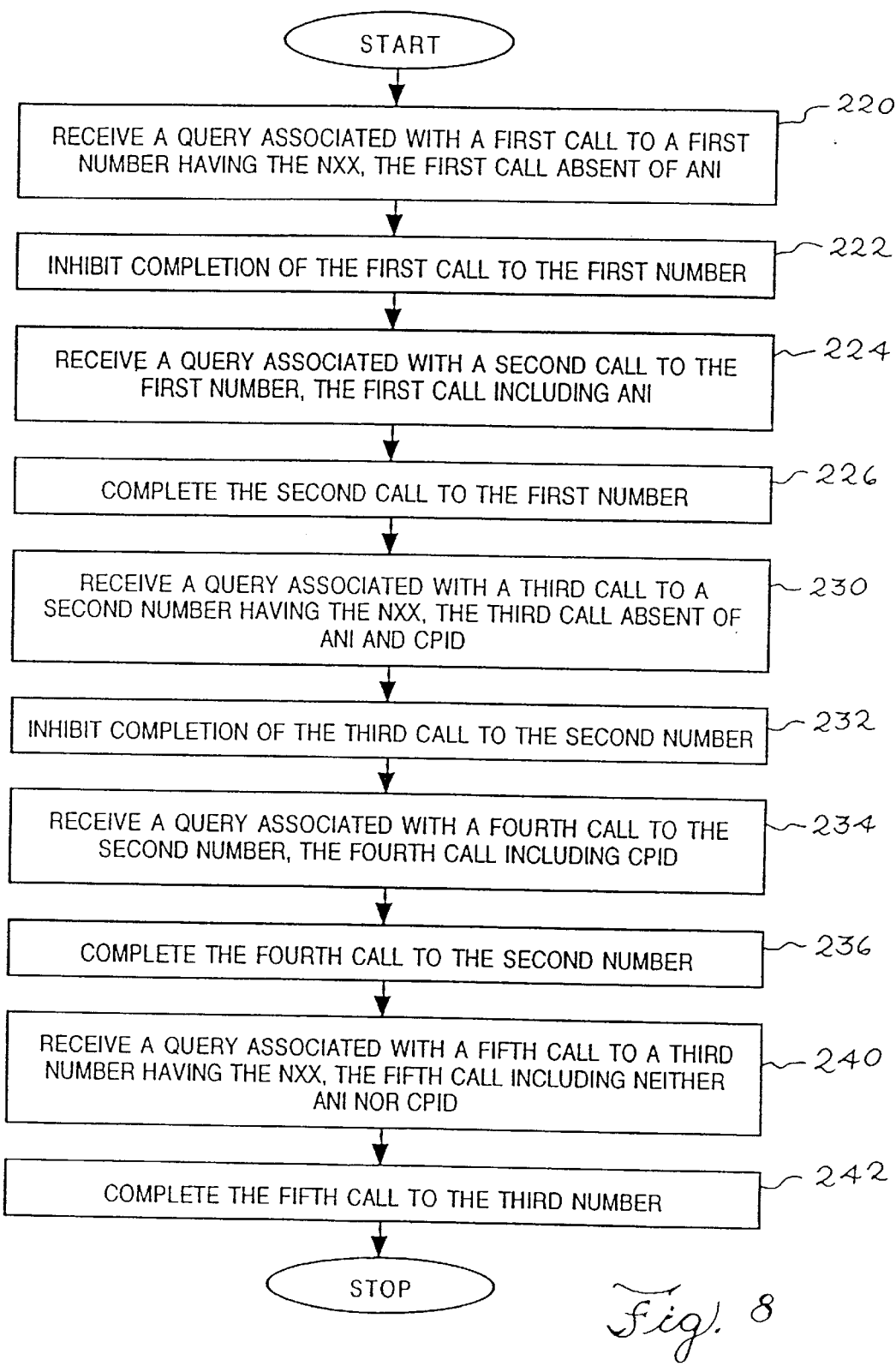
FIG. 8 is a flow chart of an embodiment of method of providing a telecommunication service for a predetermined NXX.

FIG. 8 is a flow chart of an embodiment of method of providing a telecommunication service for a predetermined NXX. The steps in the method are performed by repeating the steps described with reference to FIGS. 7A–7C for five calls. It is noted that the five calls described with reference to FIG. 8 can be received and processed in any order. Preferably, the predetermined NXX is "555".

As indicated by block 220, the method includes a step of receiving a query associated with a first call to a first number having the predetermined NXX. The first call is absent of automatic numbering identification associated therewith.

As indicated by block 222, a step of inhibiting completion of the first call to the first number is performed. The first call is inhibited based upon a record associated with the first number. The record indicates that only calls having an associated ANI are acceptable. Inhibiting completion of the first call can include sending the first call to a terminating announcement.

As indicated by block 224, a step of receiving a query associated with a second call to the first number is performed. The second call includes an associated automatic numbering identification.

As indicated by block 226, a step of completing the second call to the first number is performed. The second call is completed based upon the record indicating calls having an associated ANI are acceptable to the first number. The step of completing the second call includes sending a routing response message to a service switching point.

As indicated by block 230, a step of receiving a query associated with a third call is performed. The third call is to a second number having the predetermined NXX. The third call is absent of both automatic numbering identification and calling party identification associated therewith.

As indicated by block 232, a step of inhibiting completion of the third call to the second number is performed. The third call is inhibited based upon a record associated with the second number. The record indicates that only calls having at least one of an associated ANI and a calling party identification are acceptable. Inhibiting completion of the third call can include sending the third call to a terminating announcement.

As indicated by block 234, a step of receiving a query associated with a fourth call to the second number is performed. The fourth call has at least one of automatic numbering identification and calling party identification associated therewith For purposes of example and illustration, the fourth call is assumed to have calling party identification but not ANI.

As indicated by block 236, a step of completing the fourth call to the second number is performed. The fourth call is completed based upon the record indicating calls having either an associated ANI or calling party identification are acceptable to the second number. The step of completing the fourth call includes sending a routing response message to a service switching point.

As indicated by block 240, a step of receiving a query associated with a fifth call is performed. The fifth call is to a third number having the predetermined NXX. The fifth call is absent of both automatic numbering identification and calling party identification.

As indicated by block 242, a step of completing the fifth call to the third number. The fifth call is completed based upon a record indicating calls having neither an associated ANI or calling party identification are acceptable to the third number. The step of completing the fifth call includes sending a routing response message to a service switching point.

The aforementioned steps are performed using a SCP having a receiver to receive the queries, a processor to process the queries to form responses, and a transmitter to send the responses to the SSP.

Thus, there has been described herein a concept, as well as several embodiments including preferred embodiments of methods, systems, and databases for providing a telecommunication service.

Embodiments of the present invention provide an AIN solution rather than an end office switch-based solution for providing a 555 access service. The AIN solution offers network efficiencies and subscriber flexibility that were not previously available.

An additional step in the call flow prior to final routing advantageously reduces revenue leakage for the service provider. This additional step includes routing the call to an external database that can exclude specific classes of service when identified.

Further, embodiments of the present invention advantageously protect the current 555-1212 dialing plan. The logic for non-1212 numbers which use the 555 NXX is decoupled from the embedded 555-1212 service. Hence, there is no change in the current 555-1212 call path.

Still further, each subscriber can choose a level of information needed to process a call. The following three options are available: only pass calls with ANI (e.g. billing number passed in real time); pass calls with either ANI or a Calling Party Number (e.g. number used for screen pops.); and pass all calls (e.g. the information provider accepts calls without ANI or a Calling Party Number).

Also, the flexibility in the service logic allows the 555 service to be offered on a local, regional, national, or international basis. Calls can be completed with a seven digit dialing plan if the originating network has the ability to route on seven digits. If another network is not capable of seven digit routing, ten digits can be used to complete the call.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of processing 555 NXX calls at a switching node in a telecommunication network, the method comprising the steps of:
   receiving at the switching node a 555 NXX call;
   segregating 555-1212 calls from non-555-1212 calls;
   sending a query associated with the non-555-1212 call to a service control point; and
   directing the 555-1212 call to a directory assistance node without sending a query associated therewith to the service control point.

2. The method of claim 1 wherein the switching node includes at least one of an end office, a tandem office, and a office position system.

3. The method of claim 1 wherein the steps are ordered steps.

4. A system for processing 555 NXX calls at a switching node in a telecommunication network, the system comprising:
   means for receiving at the switching node a 555 NXX call;
   means for segregating 555-1212 calls from non-555-1212 calls;
   means for sending a query associated with the non-555-1212 calls to a service control point; and
   means for directing the 555-1212 call to a directory assistance node without sending a query associated therewith to the service control point.

5. The system of claim 4 wherein the switching node includes at least one of an end office, a tandem office, and a office position system.

6. A method of processing 555 NXX calls in a telecommunication network, the method comprising the steps of:
   receiving a 555 NXX call at a directory assistance node;
   segregating 555-1212 calls from non-555-1212 calls;
   routing the non-555-1212 call from the directory assistance node to a switch;
   receiving a 555-1212 call at the directory assistance node; and
   servicing the 555-1212 call at the directory assistance node.

7. The method of claim 6 wherein the directory assistance node includes a operator position system.

8. The method of claim 6 wherein the switch includes a tandem switch.

9. The method of claim 6 wherein the 555 NXX calls are received from an office absent of a service switching point.

10. A system for processing 555 NXX calls in a telecommunication network, the system comprising:
    means for receiving at a directory assistance node a 555 N)(X call;
    means for segregating 555-1212 calls from non-555-1212 calls;
    means for routing the 555 NXX call from the directory assistance node to a switch; and
    means for servicing the 555-1212 call at the directory assistance node.

11. The system of claim 10 wherein the directory assistance node includes a operator position system.

12. The system of claim 10 wherein the switch includes a tandem switch.

13. The system of claim 10 wherein the 555 NXX calls are received from an office absent of a service switching point.

* * * * *

UNITED STATES PATENT AND TRADEMARK OFFICE
CERTIFICATE OF CORRECTION

PATENT NO. : 6,731,736 B2  Page 1 of 1
DATED : May 4, 2004
INVENTOR(S) : William H. Meek et al.

It is certified that error appears in the above-identified patent and that said Letters Patent is hereby corrected as shown below:

Column 14,
Line 53, delete "N)(X" and substitute -- NXX -- in its place.

Signed and Sealed this

Second Day of August, 2005

JON W. DUDAS
*Director of the United States Patent and Trademark Office*